US010943357B2

(12) United States Patent
Badawy et al.

(10) Patent No.: US 10,943,357 B2
(45) Date of Patent: Mar. 9, 2021

(54) VIDEO BASED INDOOR LEAK DETECTION

(71) Applicant: IntelliView Technologies Inc., Calgary (CA)

(72) Inventors: Wael Badawy, Calgary (CA); Shan Du, Calgary (CA)

(73) Assignee: Intelliview Technologies Inc., Alberta (CA)

(*) Notice: Subject to any disclaimer, the term of this patent is extended or adjusted under 35 U.S.C. 154(b) by 0 days.

(21) Appl. No.: 14/463,590

(22) Filed: Aug. 19, 2014

(65) Prior Publication Data
US 2016/0055653 A1  Feb. 25, 2016

(51) Int. Cl.
G06T 7/254 (2017.01)
G06T 7/90 (2017.01)
G08B 21/20 (2006.01)
G08B 13/196 (2006.01)

(52) U.S. Cl.
CPC ............... *G06T 7/254* (2017.01); *G06T 7/90* (2017.01); *G08B 13/19604* (2013.01); *G06T 2207/30232* (2013.01); *G08B 21/20* (2013.01)

(58) Field of Classification Search
CPC .......... G06T 7/408; G06T 7/254; G08B 21/20
USPC ........................................................ 348/143
See application file for complete search history.

(56) References Cited

U.S. PATENT DOCUMENTS

| 2,915,975 A | 12/1959 | Kittrell et al. |
| 3,180,134 A | 4/1965 | Wadlington |
| 3,276,246 A | 10/1966 | Truman et al. |
| 3,958,607 A | 5/1976 | Gray |
| 3,967,678 A | 7/1976 | Blackwell |
| 4,023,201 A | 5/1977 | Faulkner |
| 4,045,671 A | 8/1977 | Dille et al. |
| 4,107,738 A | 8/1978 | Van Norman |
| 4,146,799 A | 3/1979 | Pitt et al. |
| 4,181,845 A | 1/1980 | Bolton |
| 4,246,604 A | 1/1981 | Hundertmark et al. |

(Continued)

FOREIGN PATENT DOCUMENTS

| CA | 1 242 506 A | 9/1988 |
| CA | 1 255 795 A | 6/1989 |

(Continued)

OTHER PUBLICATIONS

Wren, C., et al., "Pfinder: Real-Time Tracking of the Human Body," IEEE Transactions on Pattern Analysis and Machine Intelligence 19(7):780-785, Jul. 1997.

(Continued)

*Primary Examiner* — Jae N Noh
(74) *Attorney, Agent, or Firm* — Christensen O'Connor Johnson Kindness, PLLC

(57) ABSTRACT

Apparatus and corresponding method are invented for detecting indoor liquid leak in equipment, such as a pump in a pump station. The apparatus includes an image analyzer configured to receive video from one or more cameras and analyze the video to determine if a leak on the equipment is present by comparing the video with a reference and a target color and the image analyzer having an output port for delivering a notification upon the image analyzer determining that a leak is present on the equipment. If a leak alarm happens, the operator can check the remote live video and/or stored clips to confirm the leak and activate a response to stop it.

17 Claims, 2 Drawing Sheets

(56) References Cited

U.S. PATENT DOCUMENTS

| | | |
|---|---|---|
| 4,249,810 A | 2/1981 | O'Connor et al. |
| 4,372,658 A | 2/1983 | O'Connor et al. |
| 4,434,427 A | 2/1984 | Clarke et al. |
| 4,495,417 A | 1/1985 | Hohensang |
| 4,517,458 A | 5/1985 | Barringer |
| 4,542,973 A | 9/1985 | Johnson et al. |
| 4,560,931 A | 12/1985 | Murakami et al. |
| 4,607,925 A | 8/1986 | Kamigaichi et al. |
| 4,612,797 A | 9/1986 | Barkhoudarian |
| 4,655,607 A | 4/1987 | Kern et al. |
| 4,656,509 A | 4/1987 | Matsuyama et al. |
| 4,677,472 A | 6/1987 | Wood |
| 4,734,766 A | 3/1988 | Shiozumi et al. |
| 4,772,789 A | 9/1988 | Maram et al. |
| 4,841,149 A | 6/1989 | Martin et al. |
| 4,872,762 A | 10/1989 | Koshihara et al. |
| 4,886,370 A | 12/1989 | Koshihara et al. |
| 4,913,558 A | 4/1990 | Wettervik et al. |
| 4,933,678 A | 6/1990 | Tennyson |
| 4,963,742 A | 10/1990 | Abernathy |
| 4,983,836 A | 1/1991 | Matoba et al. |
| 4,988,210 A | 1/1991 | Koshihara et al. |
| 4,991,006 A | 2/1991 | Wood |
| 5,001,346 A | 3/1991 | Barkhoudarian |
| 5,084,764 A | 1/1992 | Day |
| 5,090,259 A | 2/1992 | Shishido et al. |
| 5,148,699 A | 9/1992 | Morse |
| 5,152,859 A * | 10/1992 | Sharp .................. B65D 88/76 156/169 |
| 5,175,964 A | 1/1993 | Girndt |
| 5,195,392 A | 3/1993 | Moore et al. |
| 5,210,526 A | 5/1993 | Imperiali |
| 5,245,860 A | 9/1993 | Chang et al. |
| 5,280,530 A | 1/1994 | Trew et al. |
| 5,281,826 A | 1/1994 | Ivancic et al. |
| 5,287,133 A | 2/1994 | Bohley |
| 5,295,201 A | 3/1994 | Yokohama |
| 5,329,368 A | 7/1994 | Plotke |
| 5,329,824 A | 7/1994 | Carapezza et al. |
| 5,333,501 A | 8/1994 | Okada et al. |
| 5,394,939 A | 3/1995 | Walker |
| 5,430,293 A | 7/1995 | Sato et al. |
| 5,457,288 A | 10/1995 | Olsson |
| 5,461,236 A | 10/1995 | Gram et al. |
| 5,467,640 A | 11/1995 | Salinas et al. |
| 5,501,115 A | 3/1996 | Kamiyama et al. |
| 5,517,427 A | 5/1996 | Joyce |
| 5,523,569 A | 6/1996 | Hornfeld et al. |
| 5,527,169 A | 6/1996 | Goldenberg et al. |
| 5,537,045 A | 7/1996 | Henderson |
| 5,537,336 A | 7/1996 | Joyce |
| 5,557,277 A | 9/1996 | Tricoles et al. |
| 5,592,228 A | 1/1997 | Dachiku et al. |
| 5,592,286 A | 1/1997 | Fedor |
| 5,615,007 A | 3/1997 | Matsuura et al. |
| 5,616,854 A | 4/1997 | Berg |
| 5,617,482 A | 4/1997 | Brusewitz |
| 5,654,771 A | 8/1997 | Tekalp et al. |
| 5,672,874 A | 9/1997 | Fujii et al. |
| 5,708,193 A | 1/1998 | Ledeen et al. |
| 5,734,167 A | 3/1998 | Skelly |
| 5,850,285 A | 12/1998 | Hill, Jr. et al. |
| 5,874,988 A | 2/1999 | Gu |
| 5,889,199 A | 3/1999 | Wong et al. |
| 5,939,717 A | 8/1999 | Mullins |
| 5,974,860 A | 11/1999 | Kuroda et al. |
| 5,982,909 A | 11/1999 | Erdem et al. |
| 6,020,918 A | 2/2000 | Murphy |
| 6,049,281 A | 4/2000 | Osterweil |
| 6,130,707 A | 10/2000 | Koller et al. |
| 6,157,033 A | 12/2000 | Chudnovsky |
| 6,243,483 B1 | 6/2001 | Petrou et al. |
| 6,312,226 B1 | 11/2001 | Senior, Jr. et al. |
| 6,314,137 B1 | 11/2001 | Ono et al. |
| 6,359,645 B1 | 3/2002 | Sivacoe |
| 6,362,488 B1 | 3/2002 | Cabrera et al. |
| 6,473,169 B1 | 10/2002 | Dawley et al. |
| 6,493,041 B1 | 12/2002 | Hanko et al. |
| 6,514,346 B1 | 2/2003 | Nichols |
| 6,515,799 B2 | 2/2003 | Ishijima et al. |
| 6,525,333 B1 | 2/2003 | Hooker et al. |
| 6,535,639 B1 | 3/2003 | Uchihachi et al. |
| 6,539,106 B1 | 3/2003 | Gallarda et al. |
| 6,549,643 B1 | 4/2003 | Toklu et al. |
| 6,550,499 B1 | 4/2003 | Pai |
| 6,553,140 B1 | 4/2003 | Soupliotis et al. |
| 6,577,333 B2 | 6/2003 | Tai et al. |
| 6,580,385 B1 | 6/2003 | Winner et al. |
| 6,621,516 B1 | 9/2003 | Wasson et al. |
| 6,628,805 B1 | 9/2003 | Hansen et al. |
| 6,628,831 B1 | 9/2003 | Needham |
| 6,628,835 B1 | 9/2003 | Brill et al. |
| 6,646,676 B1 | 11/2003 | DaGraca et al. |
| 6,650,704 B1 | 11/2003 | Carlson et al. |
| 6,654,481 B2 | 11/2003 | Amemiya et al. |
| 6,665,074 B2 | 12/2003 | Huang |
| 6,680,778 B2 | 1/2004 | Hinnrichs et al. |
| 6,697,523 B1 | 2/2004 | Divakaran et al. |
| 6,727,818 B1 | 4/2004 | Wildman et al. |
| 6,768,115 B2 | 7/2004 | Mikula et al. |
| 6,771,268 B1 | 8/2004 | Crinon |
| 6,791,088 B1 | 9/2004 | Williams et al. |
| 6,812,846 B2 | 11/2004 | Gutta et al. |
| 6,820,653 B1 | 11/2004 | Schempf et al. |
| 6,859,285 B1 | 2/2005 | Chang |
| 6,866,089 B2 | 3/2005 | Avila |
| 6,870,573 B2 | 3/2005 | Yeo et al. |
| 6,900,439 B2 | 5/2005 | Komiyama et al. |
| 6,931,149 B2 | 8/2005 | Hagene et al. |
| 6,948,258 B2 | 9/2005 | Coulombe et al. |
| 6,958,683 B2 | 10/2005 | Mills et al. |
| 6,965,430 B2 | 11/2005 | Kvassheim |
| 7,009,695 B2 | 3/2006 | Some et al. |
| 7,016,540 B1 | 3/2006 | Gong et al. |
| 7,022,993 B1 | 4/2006 | Williams, II et al. |
| 7,043,964 B1 | 5/2006 | Hickman et al. |
| 7,046,761 B2 | 5/2006 | Ellenbogen et al. |
| 7,062,012 B1 | 6/2006 | Chng et al. |
| 7,110,458 B2 | 9/2006 | Divakaran et al. |
| 7,127,120 B2 | 10/2006 | Hua et al. |
| 7,131,344 B2 | 11/2006 | Tarumi |
| 7,143,352 B2 | 11/2006 | Divakaran et al. |
| 7,151,852 B2 | 12/2006 | Gong et al. |
| 7,154,102 B2 | 12/2006 | Poteet et al. |
| 7,164,476 B2 | 1/2007 | Shima et al. |
| 7,189,970 B2 | 3/2007 | Racca et al. |
| 7,214,925 B2 | 5/2007 | Wagoner et al. |
| 7,289,918 B2 | 10/2007 | Nagase |
| 7,298,869 B1 | 11/2007 | Abernathy |
| 7,345,757 B2 | 3/2008 | Penza |
| 7,358,860 B2 | 4/2008 | Germouni et al. |
| 7,359,931 B2 | 4/2008 | Tarabzouni et al. |
| 7,375,814 B2 | 5/2008 | Reichardt et al. |
| 7,381,972 B1 | 6/2008 | Varmette et al. |
| 7,382,895 B2 | 6/2008 | Bramblet et al. |
| 7,385,681 B2 | 6/2008 | Ninomiya et al. |
| 7,421,461 B2 | 9/2008 | Prokop et al. |
| 7,460,980 B2 | 12/2008 | Hinn |
| 7,468,520 B1 | 12/2008 | Varmette et al. |
| 7,486,399 B1 | 2/2009 | Reichardt et al. |
| 7,505,063 B1 | 3/2009 | Bastedo et al. |
| 7,616,782 B2 | 11/2009 | Badawy |
| 7,618,603 B2 | 11/2009 | Seames et al. |
| 7,639,840 B2 | 12/2009 | Hanna et al. |
| 7,645,992 B2 | 1/2010 | Lyubchik et al. |
| 7,649,174 B2 | 1/2010 | Mammen et al. |
| 7,665,346 B1 | 2/2010 | Stauffer et al. |
| 7,669,614 B2 | 3/2010 | Cohen |
| 7,675,029 B2 | 3/2010 | Ramstad et al. |
| 7,888,941 B2 | 2/2011 | San Martin et al. |
| 7,896,073 B2 | 3/2011 | Forgang et al. |
| 7,916,170 B2 | 3/2011 | Soltysik et al. |
| 7,918,126 B2 | 4/2011 | McStay et al. |
| 7,939,804 B2 | 5/2011 | Schmidt |

(56) References Cited

U.S. PATENT DOCUMENTS

| | | |
|---|---|---|
| 7,940,297 B2 | 5/2011 | Penza et al. |
| 7,961,906 B2 | 6/2011 | Ruedin |
| 7,969,470 B2 | 6/2011 | Kishida |
| 8,004,415 B2 | 8/2011 | Boss et al. |
| 8,124,931 B2 | 2/2012 | Andrews et al. |
| 8,150,201 B2 | 4/2012 | Kasai et al. |
| 8,254,625 B2 | 8/2012 | Coulter et al. |
| 8,260,052 B1 | 9/2012 | Scannell et al. |
| 9,020,261 B2 | 4/2015 | Lipton et al. |
| 9,021,006 B2 | 4/2015 | Myers et al. |
| 9,158,975 B2 | 10/2015 | Lipton et al. |
| 9,165,190 B2 | 10/2015 | Zhang et al. |
| 9,195,883 B2 | 11/2015 | Brewer et al. |
| 9,204,107 B2 | 12/2015 | Yin et al. |
| 9,219,889 B2 | 12/2015 | Myers et al. |
| 9,240,051 B2 | 1/2016 | Liu et al. |
| 9,247,211 B2 | 1/2016 | Zhang et al. |
| 2002/0044054 A1 | 4/2002 | Krubiner et al. |
| 2002/0067259 A1 | 6/2002 | Fufidio et al. |
| 2002/0179300 A1 | 12/2002 | Gay et al. |
| 2003/0010345 A1 | 1/2003 | Koblasz et al. |
| 2003/0010918 A1 | 1/2003 | Komiyama et al. |
| 2003/0063006 A1 | 4/2003 | van Staden |
| 2003/0072004 A1 | 4/2003 | Huang |
| 2003/0076417 A1 | 4/2003 | Thomas et al. |
| 2003/0086091 A1 | 5/2003 | Hinnrichs et al. |
| 2003/0128125 A1 | 7/2003 | Burbank et al. |
| 2004/0003914 A1 | 1/2004 | Avila |
| 2004/0061781 A1 | 4/2004 | Fennell et al. |
| 2004/0122602 A1 | 6/2004 | Nagase |
| 2004/0263852 A1 | 12/2004 | Degtiarev et al. |
| 2005/0058321 A1 | 3/2005 | Buehler |
| 2005/0126263 A1 | 6/2005 | Avila |
| 2005/0131646 A1 | 6/2005 | Camus |
| 2005/0156111 A1 | 7/2005 | Racca et al. |
| 2005/0160794 A1 | 7/2005 | Sonntag et al. |
| 2005/0190966 A1 | 9/2005 | Etienne-Cummings et al. |
| 2006/0091310 A1 | 5/2006 | Furry |
| 2006/0093212 A1 | 5/2006 | Steinberg et al. |
| 2006/0115110 A1 | 6/2006 | Rodriguez et al. |
| 2006/0126785 A1 | 6/2006 | Chng et al. |
| 2006/0155194 A1 | 7/2006 | Marcotte et al. |
| 2006/0203248 A1 | 9/2006 | Reichardt et al. |
| 2006/0220888 A1 | 10/2006 | Germouni et al. |
| 2006/0238741 A1 | 10/2006 | Ninomiya et al. |
| 2007/0000310 A1 | 1/2007 | Yamartino et al. |
| 2007/0018104 A1 | 1/2007 | Parvin et al. |
| 2007/0033170 A1 | 2/2007 | Sull et al. |
| 2007/0040121 A1 | 2/2007 | Kalayeh |
| 2008/0069177 A1 | 3/2008 | Minor et al. |
| 2008/0092625 A1 | 4/2008 | Hinnrichs |
| 2008/0144885 A1 | 6/2008 | Zucherman et al. |
| 2008/0203332 A1 | 8/2008 | McStay et al. |
| 2008/0231719 A1 | 9/2008 | Benson et al. |
| 2008/0285840 A1 | 11/2008 | Kawai |
| 2009/0056949 A1 | 3/2009 | McStay et al. |
| 2009/0200466 A1 | 8/2009 | Mammen et al. |
| 2009/0313187 A1 | 12/2009 | Miller |
| 2010/0127173 A1 | 5/2010 | Schmidt |
| 2010/0158330 A1 | 6/2010 | Guissin et al. |
| 2010/0177247 A1 | 7/2010 | Sekulovski et al. |
| 2010/0211333 A1 | 8/2010 | Pruet et al. |
| 2010/0284570 A1 | 11/2010 | Grimberg |
| 2011/0018996 A1 | 1/2011 | Mian et al. |
| 2011/0075923 A1 | 3/2011 | Imai |
| 2011/0075924 A1 | 3/2011 | Shrestha et al. |
| 2011/0087444 A1 | 4/2011 | Volker |
| 2011/0101225 A1 | 5/2011 | Alawadi |
| 2011/0185790 A1 | 8/2011 | Choi et al. |
| 2011/0185791 A1 | 8/2011 | van Staden |
| 2011/0215936 A1 | 9/2011 | Ansari et al. |
| 2011/0267464 A1 | 11/2011 | Archer et al. |
| 2012/0045090 A1 | 2/2012 | Bobbitt et al. |
| 2012/0068851 A1 | 3/2012 | Jarrier et al. |
| 2012/0087573 A1 | 4/2012 | Sharma et al. |
| 2012/0150333 A1 | 6/2012 | De Luca et al. |
| 2012/0268594 A1 | 10/2012 | Haering et al. |
| 2012/0269430 A1 | 10/2012 | Deskevich et al. |
| 2013/0066568 A1 | 3/2013 | Alonso |
| 2013/0279776 A1 | 10/2013 | Guissin et al. |
| 2013/0335579 A1 | 12/2013 | Raghavan et al. |
| 2014/0050355 A1 | 2/2014 | Cobb |
| 2014/0064553 A1 | 3/2014 | Knauth |
| 2014/0105480 A1 | 4/2014 | Motomura et al. |
| 2014/0210984 A1* | 7/2014 | Warwick .................. F02C 9/18 |
| | | 348/81 |
| 2014/0278252 A1* | 9/2014 | Wold .................. G01N 27/048 |
| | | 702/189 |
| 2014/0279733 A1 | 9/2014 | Djugash |
| 2014/0340502 A1 | 11/2014 | Freeman et al. |
| 2015/0178949 A1 | 6/2015 | Ren et al. |
| 2015/0292976 A1* | 10/2015 | Xu ........................ G01M 3/38 |
| | | 348/82 |
| 2015/0317787 A1* | 11/2015 | Badawy ................ G06T 7/0008 |
| | | 382/152 |
| 2015/0379712 A1 | 12/2015 | Guissin et al. |
| 2017/0214820 A1 | 7/2017 | Davis et al. |
| 2017/0290318 A1 | 10/2017 | Bergengren |

FOREIGN PATENT DOCUMENTS

| | | |
|---|---|---|
| CA | 1306776 C | 8/1992 |
| CA | 1307839 C | 9/1992 |
| CA | 2117345 A1 | 7/1993 |
| CA | 2066578 C | 12/1998 |
| CA | 2176065 C | 1/2000 |
| CA | 2155136 C | 12/2001 |
| CA | 2416171 A1 | 7/2004 |
| CA | 2528299 A1 | 1/2005 |
| CA | 2509436 A1 | 12/2006 |
| CA | 2 277 713 C | 10/2009 |
| CA | 2 719 398 A1 | 10/2009 |
| CA | 2 437 496 C | 8/2010 |
| CA | 2 518 491 C | 11/2011 |
| CA | 2 670 571 C | 5/2012 |
| CA | 2 466 247 A1 | 7/2013 |
| CA | 2 826 115 A1 | 3/2014 |
| CN | 101846576 A | 9/2010 |
| CN | 101846576 B | 12/2011 |
| EP | 1486928 A2 | 12/2004 |
| JP | 2013-101474 A | 5/2013 |
| WO | 2005/087590 A1 | 9/2005 |

OTHER PUBLICATIONS

Zhou, P., et al., "Detection of Underground Petroleum Pipeline With Infrared Imaging Method," Acta Petrolei Sinica 27(5):127-130, 2006 [abstract].

Koschan, A., and M. Abidi, "Detection and Classification of Edges in Color Images," IEEE Signal Processing Magazine 22(1):64-73, Jan. 2005.

Saravanan, C., "Color Image to Grayscale Image Conversion," 2010 Second International Conference on Computer Engineering and Applications, Mar. 19, 2010, pp. 196-199.

"IEEE UKSim 2014: UKSim-AMSS 16th International Conference on Modelling and Simulation," Institute of Electrical and Electronics Engineers, Cambridge University, Cambridge, U.K., Mar. 26-28, 2014, <http://uksim.info/uksim2014/uksim2014.htm#Papers> [retrieved Jul. 15, 2015], 18 pages.

Amer, A., et al., "A Real-Time System for High-Level Video Representation: Application to Video Surveillance," Proceedings of SPIE—The International Society for Optical Engineering 5022(1):530-541, May 2003 (12 pages).

Badawy, W., and M. Bayoumi, "Algorithm-Based Low-Power VLSI Architecture for 2-D Mesh Video-Object Motion Tracking," IEEE Transactions on Circuits and Systems for Video Technology 12(4):227-237, Apr. 2002.

Badawy, W., and M. Bayoumi, "On Minimizing Hierarchical Mesh Coding Overhead: (HASM) Hierarchical Adaptive Structured Mesh Approach," Proceedings of the IEEE International Conference on Acoustics, Speech, and Signal Processing, Istanbul, Jun. 2000, vol. 4, pp. 1923-1926.

(56) References Cited

OTHER PUBLICATIONS

Badawy, W., and M.A. Bayoumi, "A Low Power VLSI Architecture for Mesh-Based Video Motion Tracking," EEE Transactions on Circuits and Systems II: Analog and Digital Signal Processing 49(7):488-504, Jul. 2002.

Badawy, W., et al., "VLSI Architecture for Hierarchical Mesh Based Motion Estimation," 1999 IEEE Workshop on Signal Processing Systems: Design and Implementation, Taipei, Oct. 20-22, 1999 [abstract].

Badawy, W., "Low-Power Architectures for Video-Object Coding With Low Bit-Rate Applications," doctoral dissertation, University of Louisiana at Lafayette, Spring 2000, 139 pages [abstract].

Baykal, I.C., and G. A. Jullien, "Detection of Defects in Textures With Alignment Error for Real-Time Line-Scan Web Inspection Systems," IEEE Midwest Symposium on Circuits and Systems, Oklahoma State University, Stillwater, Okla., Aug. 4-7, 2002, pp. 292-295.

Baykal, I.C., et al., "On the Use of Hash Function for Defects Detection in Textures for In-Camera Web Inspection Systems," Proceedings of the IEEE International Symposium on Circuits and Systems, Scottsdale, Ariz., May 26-29, 2002, vol. 5, pp. 665-668.

Bevilacqua, A., and M. Roffilli, "Robust Denoising and Moving Shadows Detection in Traffic Scenes," Proceedings of the Computer Society Conference on Computer Vision and Pattern Recognition, Kauai, Hawaii, Dec. 9-14, 2001, pp. 1-4.

Birchfields, S., "An Elliptical Head Tracker," 31st Asilomar Conference on Signals, Systems and Computers, Pacific Grove, Calif., Nov. 2-5, 1997, 5 pages.

Birchfields, S., "Elliptical Head Tracking Using Intensity Gradients and Color Histograms," Proceedings of the IEEE Conference on Computer Vision and Pattern Recognition, Santa Barbara, Calif., Jun. 23-25, 1998, pp. 232-237.

Bobick, A.F., et al., "The KidsRoom: A Perceptually-Based Interactive and Immersive Story Environment," Technical Report 398, M.I.T Perceptual Computing, Nov. 1996, Revised Jun. 1998, 20 pages; also appears in Presence: Teleoperators and Virtual Environments 8(4):367-391, Aug. 1999.

Brofferio, S., and F. Rocca, "Interframe Redundancy Reduction of Video Signals Generated by Translating Objects," IEEE Transactions on Communications 25(4):448-455, Apr. 1977 [abstract].

Chaudhury, S., et al., "Heuristic Search Approach to Shape Matching in Image Sequences," IEEE Proceedings E—Computers and Digital Techniques 138(2):97-105, Mar. 1991 [abstract].

Chen, H., and H. Ye, "Oil Pipeline Leak Detection and Location Based on Image Processing," Journal of Tsinghua University (Science and Technology), 2005 [abstract].

Cheung, S.-C.S., and C. Kamath, "Robust Techniques for Background Subtraction in Urban Traffic Video," Proceedings of the SPIE 5308:881-892, Jan. 2004.

Cielniak, G., and T. Duckett, "People Recognition by Mobile Robots," Journal of Intelligent and Fuzzy Systems 15(1):21-27, 2004.

Dalal, N., et al., "Histograms of Oriented Gradients for Human Detection," Proceedings of the International Conference on Computer Vision and Pattern Recognition (CVPR '05), San Diego, Jun. 25, 2005, pp. 886-893.

Darrell, T., et al., "Integrated Person Tracking Using Stereo, Color, and Pattern Detection," Proceedings of the Conference on Computer Vision and Pattern Recognition, Santa Barbara, Calif., Jun. 23-25, 1998, pp. 601-609.

"Etherlynx: Track and Field Timing in the Digital Age," Lynx System Developers, Inc., Haverhill, Mass., n.d., <http://www.finishlynx.com>, 2 pages.

"Etherlynx2000," Datasheet, Lynx System Developers, Inc., Haverhill, Mass., n.d., <http://www.finishlynx.com>, 2 pages.

"FinishLynx Release Notes," Lynx System Developers, Inc., Haverhill, Mass., Nov. 27, 2006, <http://www.finishlynx.com>, 133 pages.

Fuentes, H.A., and O. Gonzalez, "Implementation of a 2D Real-Time Correlator Based on a DSP," Oct. 3, 2005, Texas Instruments Audio and Video/Imaging Series, <http://www.techonline.com/static/feature_articles/ti/paper_3.html> [retrieved Aug. 24, 2006], 7 pages.

Garcia-Alegre, M.C., et al., "Color Index Analysis for Automatic Detection of Eggshell Defects," Proceedings of SPIE 3966:380-387, 2000.

Han, J., and B. Bhanu, "Detecting Moving Humans Using Color and Infrared Video," Proceedings of the IEEE Conference on Multisensor Fusion and Integration for Intelligent Systems, Tokyo, Jul. 30-Aug. 1, 2003, pp. 228-233.

Ivanov, Y., et al., "Tracking People in Mixed Modality Systems," Proceedings of SPIE 6508, Visual Communications and Image Processing 2007, San Jose, Jan. 28, 2008, 11 pages.

Jadin, M.S., and K.H. Ghazali, "Gas Leakage Detection Using Thermal Imaging Technique," 2014 UKSim-AMSS 16th International Conference on Computer Modelling and Simulation, Cambridge, U.K., Mar. 26-28, 2014, pp. 302-306.

Landabaso, J.-L., et al., "Shadow Removal With Morphological Reconstruction," Proceedings of Jornades de Recerca en Automàtica, Visió i Robòtica (AVR), Barcelona, 2004, 5 pages.

Lewis, J.P., "Fast Normalized Cross-Correlation," Vision Interface 10(1):120-123, 1995.

Li, B., and M.I. Sezan, "Event Detection and Summarization in Sports Video," Proceedings of the IEEE Workshop on Content-Based Access of Image and Video Libraries (CBAIVL '01), Dec. 14, 2001, pp. 132-138 [abstract].

Lipton, A., et al., "Moving Target Detection and Classification From Real-Time Video," Proceedings of the Fourth IEEE Workshop on Applications of Computer Vision (WACV '98), Princeton, N.J., Oct. 19-21, 1998, pp. 8-14 [abstract].

Lu, S., et al., "A Novel Video Summarization Framework for Document Preparation and Archival Applications," Proceedings of the 2005 IEEE Aerospace Conference, Big Sky, Mont., Mar. 5-12, 2005, pp. 1-10.

Manku, G.S., et al., "Object Tracking Using Affine Structure for Point Correspondences," Proceedings of the IEEE Conference on Computer Vision and Pattern Recognition, Puerto Rico, Jun. 17-19, 1997, 6 pages.

Ngo, C., et al., "Video Partitioning by Temporal Slice Coherency," IEEE Transactions on Circuits and Systems for Video Technology 11(8):941-953, Aug. 2001.

"Operator's Manual: FinishLynx 32," Lynx System Developers, Inc., Haverhill, Mass., Sep. 20, 2001, <http://www.finishlynx.com>, 202 pages.

Reid, I.D., and D.W. Murray, "Active Tracking of Foveated Feature Clusters Using Affine Structure," International Journal of Computer Vision 18:41-60, 1996.

Reid, I.D., and D.W. Murray, "Tracking Foveated Corner Clusters Using Affine Structure," Proceedings of the IEEE International Conference on Computer Vision, Berlin, May 11-14, 1993, pp. 76-83 [abstract].

Ruff, T., "Feasibility of Using Intelligent Video for Machine Safety Applications," Proceedings of the IEEE Industry Applications Society Annual Meeting (IAS '08), Edmonton, Alberta, Canada, Oct. 5-9, 2008, pp. 1-5.

Russell, D.M., "A Design Pattern-Based Video Summarization Technique: Moving From Low-Level Signals to High-Level Structure," Proceedings of the 33rd Annual Hawaii International Conference on System Sciences, Maui, Hawaii, Jan. 4-7, 2000, pp. 1-5.

Salvador, E., et al., "Cast Shadow Segmentation Using Invariant Color Features," Computer Vision and Image Understanding 95(2):238-259, Aug. 2004.

Shi, L., et al., "Texture Feature Application in Oil Spill Detection by Satellite Data," Congress on Image and Signal Processing (CISP '08), Sanya, China, May 27-30, 2008, pp. 784-788 [abstract].

Sidenbladh, H., "Detecting Human Motion With Support Vector Machines," Proceedings of the 17th IAPR International Conference on Pattern Recognition, Cambridge, U.K., Aug. 23-26, 2004, vol. 2, pp. 188-191.

Tian, Y., "S3-R1: The IBM Smart Surveillance System Release 1," Proceedings of the 14th Annual International Conference on Wireless and Optical Communications (WOCC 2005), Newark, N.J., Apr. 22-23, 2005 [abstract].

(56) References Cited

OTHER PUBLICATIONS

Tian, Y., et al., "Robust Salient Motion Detection With Complex Background for Real-time Video Surveillance," Motion and Video Computing 2:30-35, 2005.

Toklu, C., et al., "Tracking Motion and Intensity Variations Using Hierarchical 2-D Mesh Modeling for Synthetic Object Transfiguration," Graphical Models and Image Processing 58(6):553-573, Nov. 1996 [abstract].

Tuzel, O., et al., "Human Detection via Classification on Riemannian Manifolds," Proceedings of the IEEE Conference on Computer Vision and Pattern Recognition (CVPR '07), Minneapolis, Jun. 17-22, 2007, pp. 1-8.

Vilaplana, V., et al., "Region-Based Segmentation and Tracking of Human Faces," Proceedings of the 9th European Signal Processing Conference (EUSIPCO 1998), Rhodes, Sep. 8-11, 1998, pp. 311-314.

Wang, Y., and O. Lee, "Active Mesh—A Feature Seeking and Tracking Image Sequence Representation Scheme," IEEE Trans. On Image Processing, vol. 3, No. 5, pp. 610-624, 1994 [abstract].

Wang, Y., et al., "Use of Two-Dimensional Deformable Mesh Structures for Video Coding. II. The Analysis Problem and a Region-Based Coder Employing an Active Mesh Representation," IEEE Transactions on Circuits and Systems for Video Technology 6(6):647-659, Dec. 1996 [abstract].

Wei, Y., and W. Badawy, "A Novel Zoom Invariant Video Object Tracking Algorithm (ZIVOTA)," Proceedings of the 2003 IEEE Canadian Conference on Electrical and Computer Engineering (CCECE), Montréal, May 4-7, 2003, vol. 2, pp. 1191-1194 [abstract].

Extended European Search Report dated Jan. 2, 2017, issued in related European Application No. EP 14 79 1064, filed Apr. 29, 2014, 8 pages.

Notice of Allowance dated Oct. 26, 2018, from U.S. Appl. No. 14/243,648, filed Apr. 2, 2014, 14 pages.

\* cited by examiner

VIDEO BASED INDOOR LEAK DETECTION

TECHNICAL FIELD

Indoor leak detection.

BACKGROUND

Indoor liquid leak detection is very important for many facilities, such as a home water tank, gasoline pump station, etc. Detecting a leak and generating an alert can avoid the damage of the facility, save money and protect the environment.

SUMMARY

An indoor liquid leak detection system for the detection of a leak from a gasoline pump station is disclosed. The system may be used for other liquid containers and carriers. The system makes use of color video camera(s) to monitor the pumps. An alarm is activated when a leak is detected over a predetermined time interval. The invention can be used for industrial applications where the detection of leaking liquids is desirable to prevent environmental damage or other unwanted results. The invented system in some embodiments may be easy to install, not disturb the equipment's operation, and not change the equipment's architecture.

In an embodiment, there is provided a video-based indoor leak detection system. The detection system comprises a video capturing device (for example, a video camera) having a field of view; an image analyzer configured to analyze the video to determine if a leak on the equipment is present; and an output port for delivering a notification upon the image analyzer determining that a leak is present. Further embodiments may also include one or more of the following features: a video recording unit for recording events, for example video corresponding to an alarm, which may be stored according to the time and the classification for further reference; a server may comprise the image analyzer and video recording unit; the server may be connected to the video capturing device via a telecommunications network; and the video may comprise pixel values that are representative of color and the image analyzer may determine if a leak on the equipment is present from the pixel values that are representative of color.

In an embodiment, there is provided a method of detecting a leak in equipment, the method comprising acquiring video of the target with video camera, in which the video comprises pixel values that are representative of color, sending the video to an image analyzer, the image analyzer analyzing video to determine if a leak is present on the equipment from the pixel values that are representative of color; and upon the image analyzer determining that a leak is present, generating a notification of the presence of a leak. Further embodiments may have one or more of the following features: at the time a leak is determined, events such as video data corresponding to an alarm may be stored to the local hard disk of the server or a removable disk for further reference; analyzing the video may comprise comparing the color of the video with color information from a reference frame; analyzing the video may comprise comparing the color of the video with a target color; analyzing the video may comprise comparing a difference between a frame being analyzed and a reference frame to a difference between two reference images; analyzing the video may comprise comparing the color of the video with a target color and comparing a difference between a frame being analyzed and a reference frame to a difference between two reference images; and in which the presence of a leak is determined upon determining that a portion of the frame being analyzed is similar to or darker than the target color and is also darker than the reference frame and the difference between the frame being analyzed and the reference frame is larger than the difference between the two reference images by an amount exceeding a threshold according to a metric; analyzing may be carried out by analysis of one or more regions of interest (ROIs) in the video; the one or more regions of interest may be user selected; and the equipment may comprise a pump.

These and other aspects of the device and method are set out in the claims, which are incorporated here by reference.

DETAILED DESCRIPTION

Immaterial modifications may be made to the embodiments described here without departing from what is covered by the claims.

Figure 1:
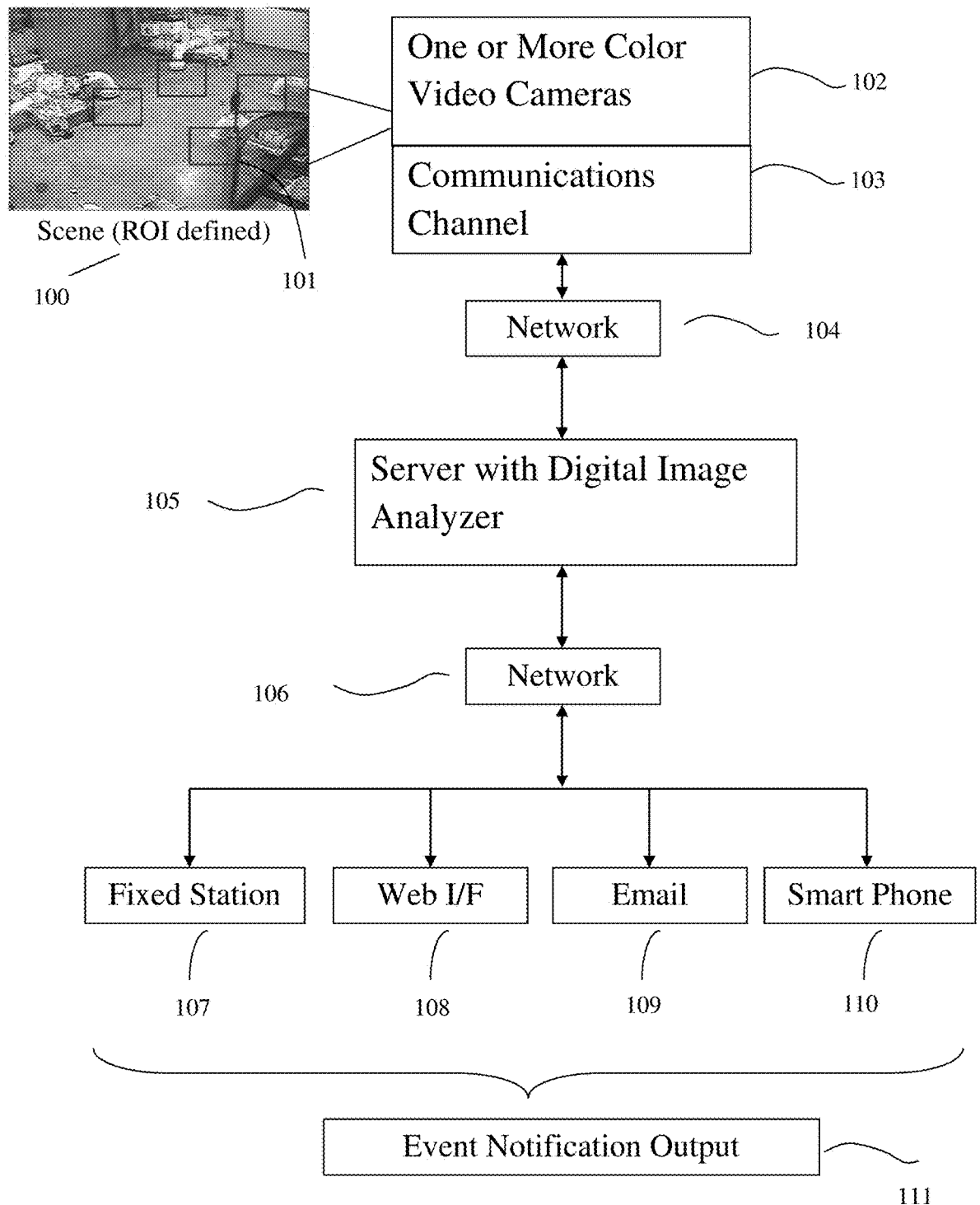
FIG. 1 is a block diagram of the video based leak detection system.
Figure 2:
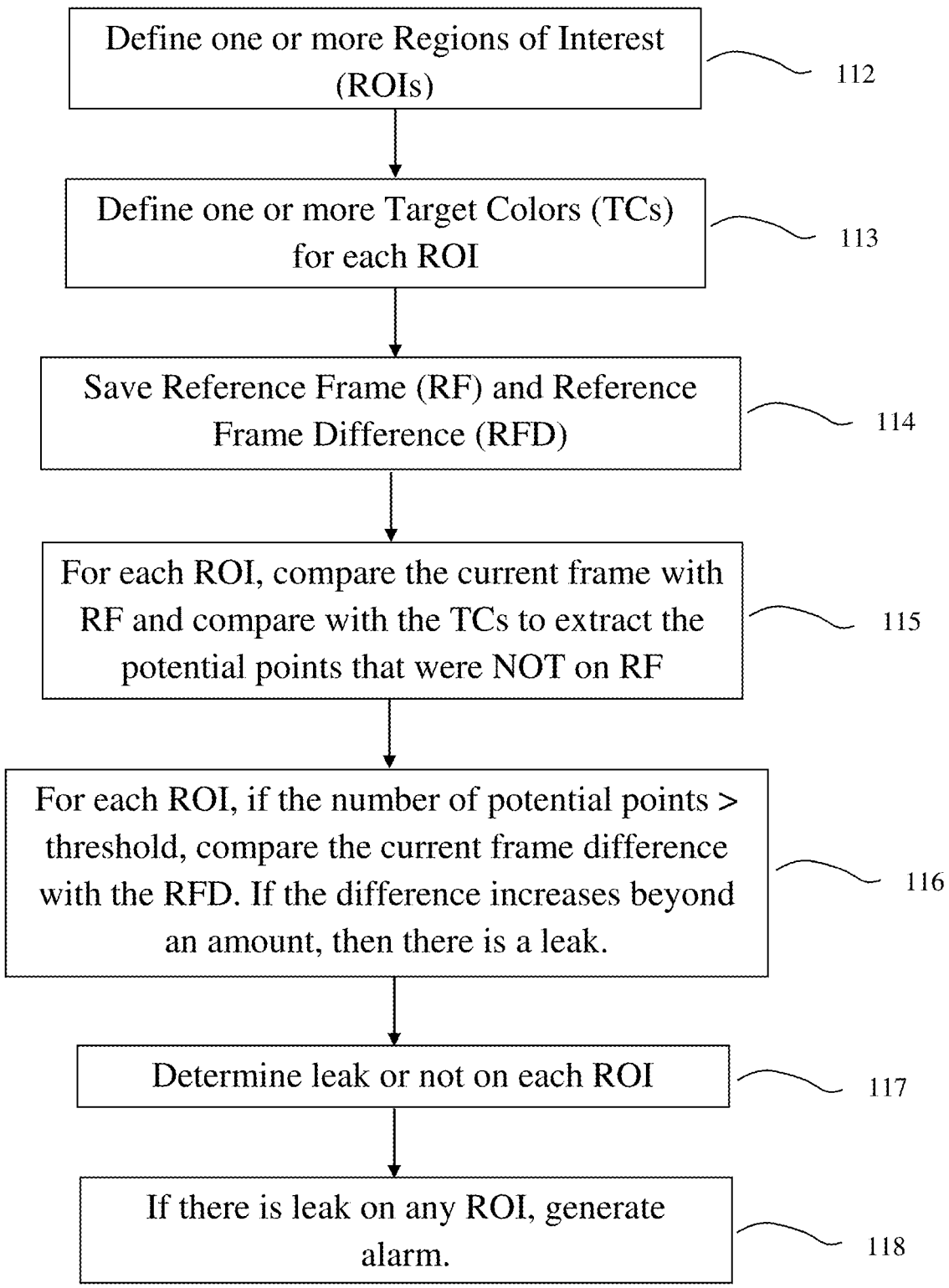
FIG. 2 illustrates method steps carried out by the image analyzer.

A video based leak detection system is shown in FIG. 1 where one or more video cameras 102 are installed to view a scene 100, here a pump station with several pumps. The camera 102 acquires the video of the scene 100 including the pumps. Regions of interest (ROIs) 101 may be defined within the scene as described below.

A video is a sequence of consecutive frames. A frame is a set of pixel values determined by light received in the one or more cameras 102 at locations on an imaging device in the camera corresponding to locations of the view. The video can be sent to a conventional input port of a server 105 directly, for example via a conventional cable, or indirectly via a suitable communications channel 103 such as a radio that communicates through a telecommunications network 104. A direct connection can also use a radio and an indirect connection through a network 104 can also use a cable. In some embodiments, the server 105 may be formed of a local processor (for example, to carry out basic control of the camera) as well as a remote processor for carrying out other functions such as image analysis. In some embodiments with a local processor and a remote processor, the local processor may be directly connected to the one or more video cameras 102 and the remote processor may be connected to the local processor via network 104.

In the embodiment shown, the server 105 analyzes the video and then determines if the scene 100 has a leak or not. The server comprises an image analyzer. Here, "comprises" may indicate that either the image analyzer is a separate physical component of the server or the image analyzer is software operating on a processor of the server. The server may also comprise a video recording unit, in the same sense of "comprise." The video recording unit may be connected to the image analyzer, with a connection that can be a physical connection or a software connection. A pump is an example of a target to which the method and apparatus may be applied. The method and apparatus may be applied to other targets. The server 105 may cause a notification 111 to be generated and output from an output port of the server 105, which may be any of a variety of notifications, and may be communicated directly to an operator or through a network 106, which may be the same network as network 104, via suitable methods such as through a fixed station 107, web interface 108, email 109 or smart phone 110. The output port may be, for example, a USB port, network interface, display driver or other conventional output port of a computer. The notification 111 may comprise an electronic message indicative of a leak, or the generation of a sound, light signal, mechanical signal or other signal that may be observed by a human or monitoring equipment. The server 105 may communicate two-way with a further remote server (not shown) or other remote device such as smart phone 110. In on demand operation, the remote device may instruct the server 105 to acquire video from the camera 102 and the video is then processed by the server 105. In some embodiments, the server 105 may be a remote server and need not be situated with the camera 102.

The server 105 performs the image analysis, leak detection and notification sending tasks. For image analysis, color information is proposed to be used. If there is a leak, some portions of the current frame, for example, the part of floor with accumulated leaking liquid, should be darker than the reference and similar to or darker than the target color. In some embodiments, the analyzer 105 may intelligently compare the video with a reference, using more sophisticated statistical analysis than a greater than-less than analysis. For example, where a suite of training images is available, including some leak and non-leak images, perhaps being separated in time by hours or days, statistical analysis such as Bayesian or neural network analysis may be applied to determine a probability of a leak.

Since the video is captured at various distance, direction and zoom levels, the users may be required in an initialization step 112 to defined one or more regions of interest (ROI). In an embodiment, a software interface in the server 105 lets the users draw rectangle boxes around ROIs 101. In other embodiments, the user may draw other shapes to define ROIs. The use of regions within a scene allows the detection unit to individually check the leak in each region.

For each ROI 101 defined in step 112, the users can set one or more target color (TC) through the user interface (not shown) in step 113. The target color may be a color representing a color of a potentially leaking liquid. The target color representing a color of a potentially leaking liquid may represent an expected color of the liquid in an expected context, for example, a mixed color of the floor and the liquid when the leaking liquid is poured on the floor.

After the ROI is defined in step 112 and TC is set in step 113, a reference frame (RF) and a reference frame difference (RFD) are saved in step 114 for further processing. The RFD is obtained by subtracting two frames.

In step 115, for each ROI 101, the current frame is compared with the TC set in step 113. The points that are similar to or darker than the TC are considered. If the considered points are changed a lot compared with the RF, for example if the differences from the reference frame are greater than a threshold, they are defined as potential points.

Because of the lighting change (or reflection) in the environment, some potential points may not be related to a leak. Therefore, in step 116 we will filter them out by comparing with the reference frame difference (RFD). Even though there is no leak at the time that the RFD is obtained in step 114, we still can see some difference in the image. This is because of the background lighting change or some reflection by the floor. If there is a leak, the amount of frame difference should be much larger than the reference frame difference. For each region of interest, if the amount of potential points is larger than the frame difference according to a metric by a threshold, and if the area occupies a certain percentage of the whole region, the server determines that there is a leak in that ROI in step 117. If any ROI is determined to have a leak in step 117, the server generates an alarm in step 118. The metric listed above can be the number of pixels that differ from the reference frame by more than a second threshold, and the threshold can be a fixed number of pixels or a multiple of the reference frame difference.

Events, for example video corresponding to an alarm, can be stored by the server 105 to a local hard disk of the server or a removable disk according to time or classification for further reference.

The embodiments of the invention in which an exclusive property or privilege is claimed are defined as follows:

1. A video based leak detection system for detecting an indoor liquid leak from equipment, the system comprising:
   a color video camera having a field of view for generating a video, in which the video comprises pixel values that are representative of color of objects in the field of view;
   an image analyzer connected to receive the video and configured to analyze the video by comparing the pixel values that are representative of color of objects in the field of view to a preselected target color representing a color that a liquid potentially leaking from the equipment is expected to have, given an expected context, when outside the equipment in the field of view of the camera, and configured to determine that a leak on the equipment is present based on the pixel values being similar in color and similar or darker in brightness than the preselected target color; and
   the image analyzer having an output port for delivering a notification upon the image analyzer determining that a leak is present.

2. The video based leak detection system of claim 1 further comprising a video recording unit connected to the image analyzer for recording at least a portion of the video, the portion of the video corresponding to the determination that a leak is present.

3. The video based leak detection system of claim 2 in which a server comprises the image analyzer and video recording unit.

4. The video based leak detection system of claim 3 in which the server is connected to the video camera via a telecommunications network.

5. A method of detecting an indoor liquid leak from equipment, the method comprising:
   acquiring video with a color video camera, in which the video comprises pixel values that are representative of color of objects in the field of view;
   sending the video to an image analyzer;
   the image analyzer analyzing the video by comparing the pixel values that are representative of color of objects in the field of view to a preselected target color representing a color that a liquid potentially leaking from the equipment is expected to have, given an expected context, when outside the equipment in the field of view of the camera, the image analyzer determining that a leak is present on the equipment based on the pixel values being similar in color and similar or darker in brightness than the preselected target color; and
   upon the image analyzer determining that a leak is present, generating a notification of the presence of a leak.

6. The method of claim 5 in which analyzing the video comprises comparing the pixel values that are representative of color of objects in the field of view with color information from a reference frame.

7. The method of claim 5 in which analyzing the video comprises comparing a difference between a frame being analyzed and a reference frame to a difference between two reference images.

8. The method of claim 7 in which determining the presence of a leak comprises determining that the difference between the frame being analyzed and the reference frame is larger than the difference between the two reference images by an amount exceeding a threshold according to a metric.

9. The method of claim 5 in which analyzing is carried out by analysis of one or more regions of interest in the video.

10. The method of claim 9 in which the one or more regions of interest is user selected.

11. The method of claim 5 in which the equipment comprises a pump.

12. The video based leak detection system of claim 1 in which the image analyzer is also configured to compare the pixel values that are representative of color of objects in the field of view to a reference frame, and the image analyzer being configured to determine that a leak is present based on the pixel values being similar to or darker than the target color and having differences from the reference frame that are greater than a threshold.

13. The method of claim 5 in which the image analyzer compares the pixel values that are representative of color of objects in the field of view to the target color and to a reference frame, the image analyzer determining that a leak is present on the equipment based on the pixel values being similar to or darker than the target color and having differences from the reference frame that are greater than a threshold.

14. The video based leak detection system of claim 1 in which the target color is user selected.

15. The method of claim 5 in which the target color is user selected.

16. The video based leak detection system of claim 1 in which the image analyzer is configured to compare the pixel values that are representative of color of objects in the field of view to multiple preselected target colors.

17. The method of claim 5 in which the image analyzer compares the pixel values that are representative of color of objects in the field of view to multiple preselected target colors.

* * * * *